(12) United States Patent
Lee

(10) Patent No.: US 10,257,254 B2
(45) Date of Patent: Apr. 9, 2019

(54) METHOD AND ASSOCIATED SERVER FOR PROVIDING USER-FRIENDLY OPERATION

(71) Applicant: Synology Incorporated, Taipei (TW)

(72) Inventor: Yi-Chien Lee, Taipei (TW)

(73) Assignee: SYNOLOGY INCORPORATED, Taipei (TW)

( * ) Notice: Subject to any disclaimer, the term of this patent is extended or adjusted under 35 U.S.C. 154(b) by 171 days.

(21) Appl. No.: 15/289,986

(22) Filed: Oct. 11, 2016

(65) Prior Publication Data

US 2017/0264666 A1 Sep. 14, 2017

(30) Foreign Application Priority Data

Mar. 10, 2016 (TW) .............................. 105107277 A

(51) Int. Cl.
*H04L 29/08* (2006.01)

(52) U.S. Cl.
CPC .............. *H04L 67/02* (2013.01); *H04L 67/16* (2013.01)

(58) Field of Classification Search
CPC ...................................................... H04L 67/02
See application file for complete search history.

(56) References Cited

U.S. PATENT DOCUMENTS

| | | | | |
|---|---|---|---|---|
| 6,170,019 | B1* | 1/2001 | Dresel | G06F 11/0757 719/330 |
| 6,192,415 | B1* | 2/2001 | Haverstock | G06F 17/211 707/E17.112 |
| 6,941,369 | B1 | 9/2005 | Krack | |
| 7,272,628 | B1* | 9/2007 | Pravetz | H04L 63/10 709/203 |
| 7,464,142 | B2* | 12/2008 | Flurry | H04L 67/2814 709/213 |
| 2001/0054086 | A1* | 12/2001 | Miyahira | G06F 17/289 709/218 |
| 2003/0014504 | A1 | 1/2003 | Hess | |
| 2007/0143434 | A1* | 6/2007 | Daigle | G06F 17/30861 709/207 |

(Continued)

FOREIGN PATENT DOCUMENTS

| | | |
|---|---|---|
| TW | 201039594 A1 | 11/2010 |
| TW | I379231 | 12/2012 |
| TW | 201401081 A | 1/2014 |

OTHER PUBLICATIONS

Md. Faizul Bari et al., Advanced pWeb Features, David R. Cheriton School of Computer Science, University of Waterloo, XP055367157, Jun. 2012, URL:https://cs.uwaterloo.ca/sites/ca.computer-science/files/uploads/files/CS-2013-13.pdf.

(Continued)

*Primary Examiner* — Lashonda T Jacobs
(74) *Attorney, Agent, or Firm* — McClure, Qualey & Rodack, LLP

(57) ABSTRACT

A server includes a web page service module, a first CGI module and a second CGI module, in which the first CGI module and the second CGI module correspond to applications required to be executed by different respective authorities. In the operations of the server, the web page service module receives a request from a device external to the server, and the web page service module determines contents of the request to select the first CGI module or the second CGI module in order to execute the request.

16 Claims, 7 Drawing Sheets

(56) References Cited

U.S. PATENT DOCUMENTS

| | | | |
|---|---|---|---|
| 2010/0218106 A1* | 8/2010 | Chen | G06F 17/30899 715/738 |
| 2010/0257231 A1* | 10/2010 | Yu | G06F 9/54 709/203 |
| 2012/0158823 A1* | 6/2012 | Ahuja | G06F 9/54 709/203 |
| 2013/0117350 A1* | 5/2013 | Beck | G06F 9/4843 709/203 |
| 2014/0208294 A1* | 7/2014 | Randhir | G06F 9/45512 717/115 |
| 2017/0046449 A1* | 2/2017 | Levi | G06F 17/30905 |

OTHER PUBLICATIONS

Heiko Webers, Web Application Security Put Into Practice Ruby on Rails Security, OWASP, XP055367117, Aug. 8, 2007, URL:https://www.owasp.org/images/archive/2/26/20071031153117!Owasp-rails-security.pdf.

Reyk Floeter, Introducing OpenBSD's new httpd, Esdenera Networks GmbH, XP055366919, Mar. 2015, URL:http://www.openbsd.org/papers/httpd-asiabsdcon2015.pdf.

George Gousios et al, A Comparison of Portable Dynamic Web Content Technologies for the Apache Server, May 2002, XP055367124, pp. 1-15, URL:http://www.dmst.aueb.gr/dds/pubs/conf/2002-SANE-DynCont/html/dyncont.pdf.

* cited by examiner

METHOD AND ASSOCIATED SERVER FOR PROVIDING USER-FRIENDLY OPERATION

BACKGROUND OF THE INVENTION

1. Field of the Invention

The present invention relates to the field of servers, and more particularly, to a server and an associated method capable of selecting one of a plurality of different CGI modules according to the contents of a request command.

2. Description of the Related Art

In a server structure, if a server supports two or more ports, the two or more web page service modules may be required to execute corresponding request commands, in which the web page service modules are independent of each other. Furthermore, when a user enters a URL on a browser, the user may also have to enter a corresponding port to access desired services through the web page service modules. For example, if the user needs to use a system management interface in the server, a corresponding port value should be entered in the end location of the URL, e.g. http://IP:999, where the number 999 is the corresponding port value of the system management interface. This causes the user some inconvenience when setting the domain name of the server in this way.

SUMMARY OF THE INVENTION

An objective of the present invention is to provide a server comprising a single web page service module, wherein the web page service module may refer to the contents of the request command to select one of a plurality of different common gateway interface (CGI) modules in order to execute the request command, wherein the different CGI modules correspond to different respective ports. Through the embodiments of the present invention, the user no longer needs to enter the port value when entering an URL to a browser. Further, the user may easily set the domain name of the server, thus improving the user experience.

According to an embodiment of the present invention, a server is provided. The server comprises a web page service module, a first common gateway interface (CGI) module and a second CGI module. The web page service module is arranged to receive a request command external to the server. The second CGI module and the first CGI module correspond to applications which should be executed by different respective authorities. The web page service module determines contents of the request command to select the first CGI module or the second CGI module in order to execute the request command.

According to another embodiment of the present invention, a method for executing a request command is provided. The method comprises: receiving a request command external to a server; determining contents of the request command in order to select a first CGI module or a second CGI module to execute the request command, wherein the second CGI module and the first CGI module correspond to applications which should be executed by respective different authorities.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
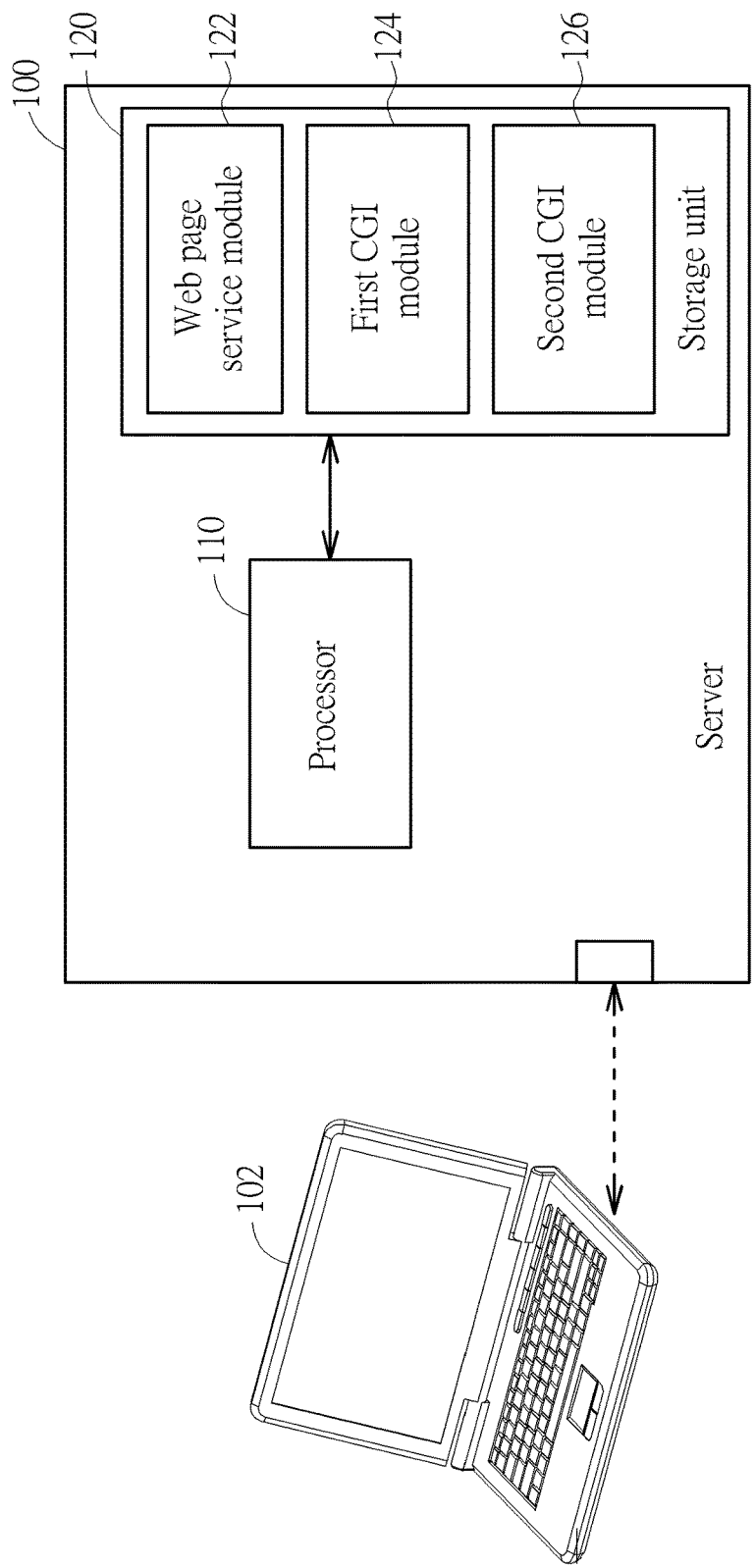
FIG. 1 is a diagram illustrating a server according to an embodiment of the present invention.

FIG. 1 is a diagram illustrating a server 100 according to an embodiment of the present invention. The server 100 at least includes a processor 110 and a storage unit 120, in which the storage unit 120 includes a web page service module 122, a first common gateway interface (CGI) module 124, and a second CGI module 126. In this embodiment, the first CGI module may be a fast CGI module, and the second CGI module may be a simple CGI (SCGI) module. In this embodiment, the server 100 may be a multifunction network attached storage server, which includes functions of a web page server. The server 100 may receive a request command of a user from the electronic device 102 through the web page service module 122, in order to access static web page data, web page program or internal file data. For example, the server 100 may utilize the web page service module 122 to receive a uniform resource locator (URL) from the user, such as a HyperText Transfer Protocol (HTTP) request. Then, the server 100 may process the HTTP, and send an HTTP response to the user. It should be understood that the server of the present invention is not limited to a web server. The server 100 may also include other functions.

In practice, the web page service module 122, fast CGI module 124 and SCGI module 126 may be implemented by software. The processor 110 executes one or more program codes in the storage unit 120, so that the program codes execute the operations of the web page service module 122, fast CGI module 124 and SCGI module 126.

When the web page service module 122 executes the request command from the user, the web page service module 122 assigns at least one worker to execute the operation request. In this embodiment, the web page service module 122 is implemented with the structure of an Nginx web page server. Specifically, there are two execution modes related to the workers in the Nginx web page server: the master process, and the worker process, in which the master process is arranged to monitor the states and numbers of the worker processes. The master process will create multiple workers when the server 100 is powered on, and the external request commands will be executed by these workers. The fast CGI module 124 and SCGI module 126 may also set multiple workers to execute the received request commands.

Figure 2:
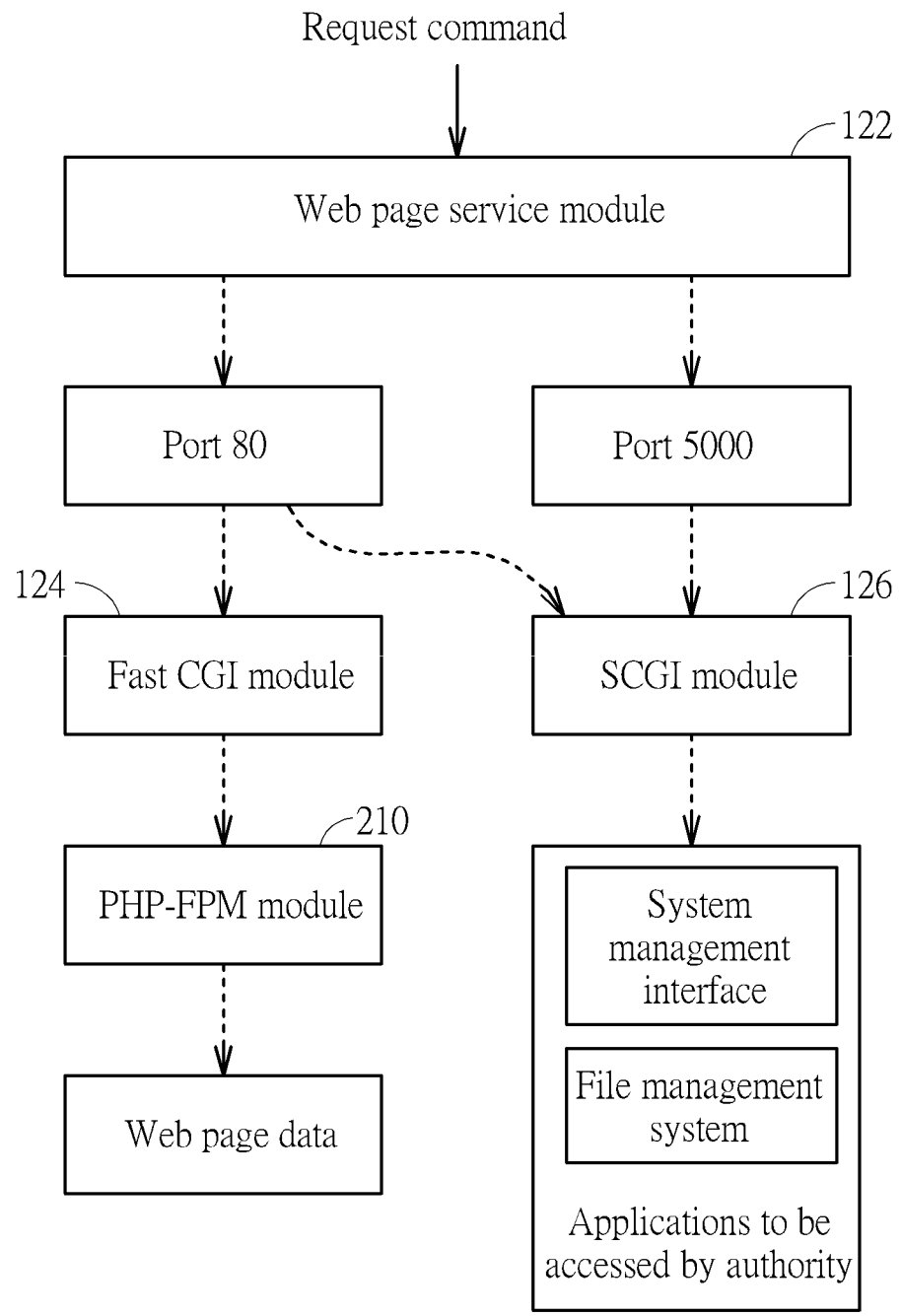
FIG. 2 is a diagram illustrating the scheme of a web page service module, fast CGI module and SCGI module according to an embodiment of the present invention.

FIG. 2 is a diagram illustrating the scheme of a web page service module 122, fast CGI module 124 and SCGI module

126 according to an embodiment of the present invention. The server 100 includes at least two ports, in which the port 80 is applicable to the HyperText Transport Protocol (HTTP), and the port 5000 is arranged to be accessed by using authority. In this embodiment, the port 80 is the default port, meaning the port 80 will be adopted when no port is specified in the request command. In the operations of FIG. 2, all the request commands from the electronic device 102 are processed by the web page service module 122. The web page service module 122 refers to the application corresponding to the request command or the contents of the request command to decide which port and which CGI module should be selected to execute the request command. Assuming that the request command only needs to access the web page data, the web page service module 122 will select the fast CGI module 124 to execute the request command through the port "80", and access the web page data in the server 100 through the PHP-FPM (fast CGI process manager) module 210. Then, the web page data is sent back to the electronic device 102. Assuming that the request command needs to access applications that must be executed by authority (e.g. the system management interface or file management system), and the request command does not specify any port, the web page service module 122 will select the SCGI module 126 to execute the request command through the port "80", so as to access the data in the system management interface or in the file management system of the server 100. Then, the data is sent back to the electronic device 102. Further, assuming that request command needs to access applications that must be executed by authority (e.g. the system management interface or file management system), and the request command specifies the port "5000", the web page service module 122 will select the SCGI module 126 to execute the request command through the port "5000", in order to access the data in the system management interface or in the file management system of the server 100. Then, the data is sent back to the electronic device 102.

The web page service module 122 may include a configuration file, which records features corresponding to each port or each CGI module. When receiving an external request command/URL, the web page service module 122 may determine whether the request command/URL conforms to the features recorded in the configuration file, to thereby select a corresponding port and a corresponding CGI module.

Figure 3:
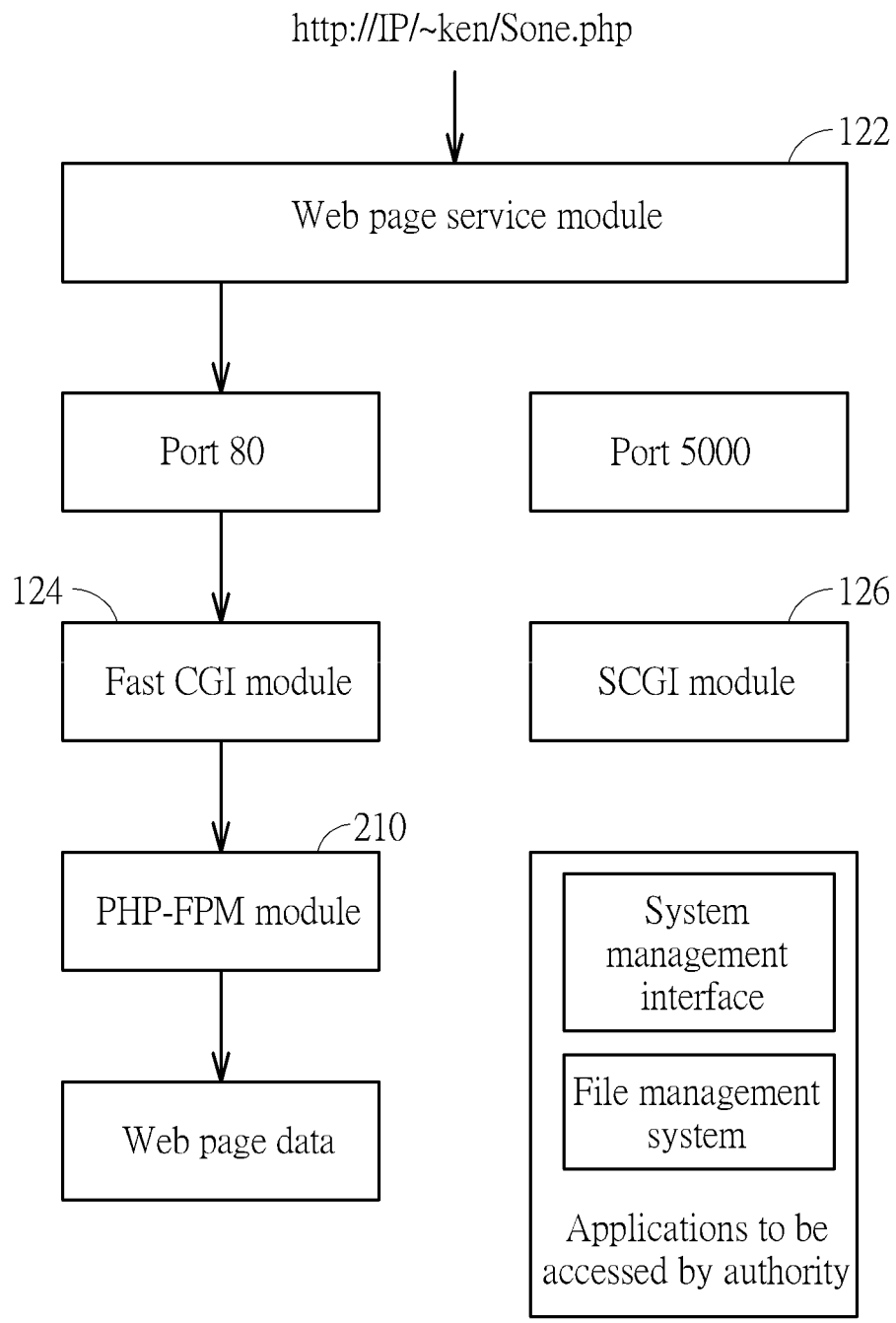
FIG. 3 is a diagram illustrating the selection of CGI modules based on the request command according to an embodiment of the present invention.
Figure 4:
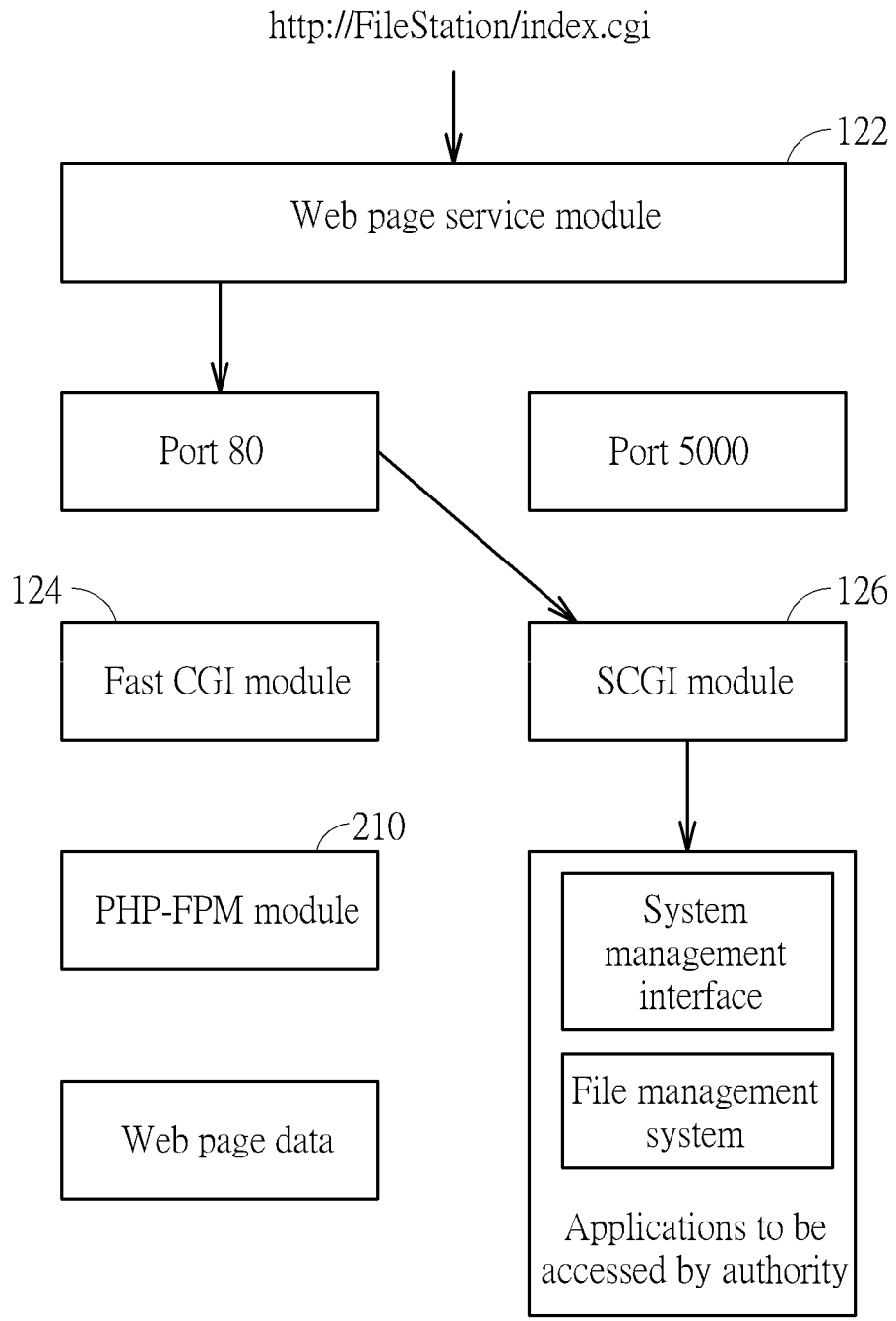
FIG. 4 is a diagram illustrating the selection of CGI modules based on the request command according to another embodiment of the present invention.

FIG. 3 is a diagram illustrating the selection of CGI modules based on the request command according to an embodiment of the present invention, and FIG. 4 is a diagram illustrating the selection of CGI modules based on the request command according to another embodiment of the present invention. As shown in FIG. 3, the web page service module 122 may determine whether the URL entered by the user includes a web page filename (e.g. determining whether a static or dynamic web page includes a specific filename extension), to decide which CGI module should be selected. Assuming that the user enters "http://IP/~ken/Sone.php" on the electronic device 102, since the above URL does not have port information, the web page service module 122 will directly select the port "80". Then, via checking whether "Sone.php" is included in the URL, the web page service module 122 may learn that the user needs to access the web page program data. The web page service module 122 will select the fast CGI module 124 to execute the request command, access the web page data in the server 100 through the PHP-FPM module 210, and send the web page data to the electronic device 102. As shown in FIG. 4, assuming that the user inputs http://FileStation/index.cgi on the electronic device 102, the web page service module 122 may check whether "FileStation" is included in the URL, to learn that the application to be accessed should be executed by authority, such as the file management system applications. The web page service module 122 will select the SCGI module 126 to execute the request command in order to access the data in the file management system of the server 100, and sends back the data to the electronic device 102.

As mentioned above, the web page service module 122 refers to the contents of the request command for selecting a CGI module to execute the request command, in order to correctly access files and execute the expected applications. As the user no longer needs to enter the port value when entering the URL on the browser, the user experience is improved. Further, the web page service module 122 may link the fast CGI module 124 and SCGI module 126 through the TCP and/or Unix domain socket, thus separating execution authorities of the web page service module 122 from the fast CGI module 124 and the SCGI module 126.

The way the server 100 processes the request command may allow the user to more easily customize the domain name of the server 100. The implementation details are as follows.

Public domain names need to be registered to a domain name registrar before being searched through the internet. After the ownership of a domain name is granted, the domain name system (DNS) can be set, and the domain name can be resolved to the mapped internet protocol (IP). The above operations are complicated and require certain technical skill. In order to simplify the above steps of setting the domain name, in an embodiment of the present invention, the operating system (OS) of the server 100 may utilize the NetBIOS communications protocol used by Microsoft Windows, or the mDNS communications protocol used by Unix, to achieve the goal of setting the domain name and resolving the IP address. Specifically, the user of the server 100 may directly set a desired domain name in a local area network (LAN), utilize the NetBIOS or mDNS communications protocol to resolve the IP address, and broadcast the designated domain name to a private network environment or the LAN. The user of the server 100 can therefore easily set the domain name, and other users in the same LAN may directly link to the server 100 by entering "http://Diskstation" or "http://Diskstation.local" on their browser, which improves the user experience. The aforementioned domain name set by the user may be directly bound to a specific application. When the user enters the domain name that has been set, the electronic device may directly link to specific applications of the server 100, without needing to use the system management interface. For example, the user may set a first domain name to link to a file management system application of the server 100, and further set a second domain name to link to a music playing application of the server 100.

Figure 5:
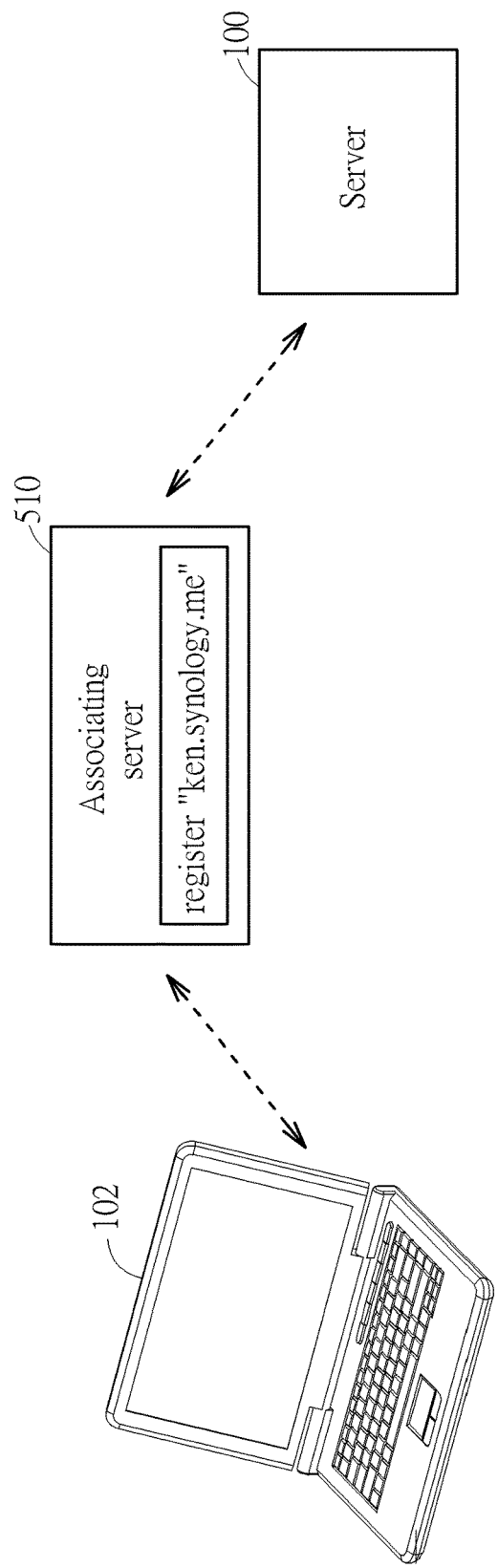
FIG. 5 is a diagram illustrating registering for a domain name according to an embodiment of the present invention.

The aforementioned method adopting the NetBIOS or mDNS communications protocol is only applicable to LANs. When Internet access is needed, another associating server, such as the dynamic DNS (DDNS) provided by the Synology™ company, must be used. FIG. 5 is a diagram illustrating registering for a domain name according to an embodiment of the present invention. In order to make the user link to the server 100 with a specific URL, the user of the server needs to register the URL from the associating server 510 first, so that the IP address of the server 100 is associated with a specific domain name. The specific URL may include a specific URL Pattern including the identification information of a web page server (e.g. the server 100) to which the user wants to link. For example, the URL pattern may be "http://SERVER_ID.domain", in which the symbol "SERVER_ID" represents the identification information of the server 100 and the symbol "domain" represents the domain name of the server 510. In this embodiment, the domain name of the server 510 is "synology.me". Hence, the server 100 may register "ken.synology.me" from the server 510. Then, when the user attempts to access some applications in the server 100, the user only needs to enter "http://APPLICATION_ID.SERVER_ID.domain" to the browser of the electronic device, and this URL will be directly transmitted to the associating server 510. The associating server 510 may utilize the previously registered data to obtain the IP address of the server, and then transmit the request command of the electronic device to the server 100. Meanwhile, the associating server 510 may also identify the symbol "APPLICATION_ID" and attach it to the request command of the server 100, in order to enable the service corresponding to "APPLICATION_ID". For example, the user only needs to enter "file.ken.synology.me" or "audio.ken.synology.me" on the browser of the electronic device 102, to directly enable the file management system application or music playing application of the server 100.

Figure 6:
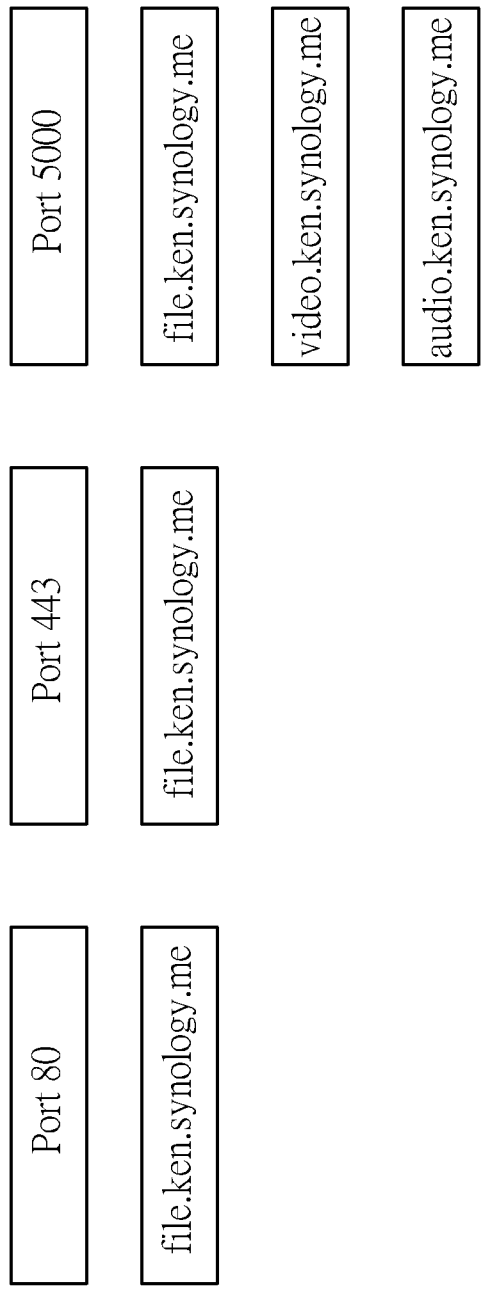
FIG. 6 is a diagram illustrating the domain names corresponding to different ports.

In the aforementioned embodiments, the web page service module 122 in the server 100 includes a profile describing the executable domain name of each port. FIG. 6 is a diagram illustrating the domain names corresponding to different ports. As shown in FIG. 6, the port "80" has registered "file.ken.synology.me", the port "443" has registered "file.ken.synology.me", and the port "5000" has registered "file.ken.synology.me", "video.ken.synology.me" and "audio.ken.synology.me". After the web page service module 122 receives the contents of the request command, the web page service module 122 will confirm the ports corresponding to the request command, and then compare the registered domain names. Note that only the correctly registered domain names (or request commands) can be provided with corresponding services by the web page service module 122.

Figure 7:
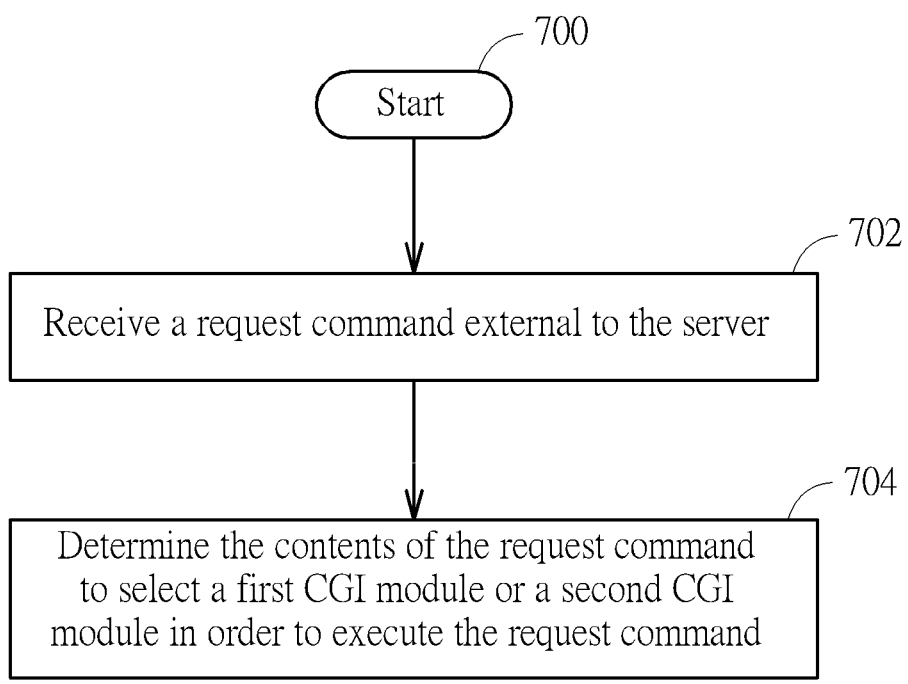
FIG. 7 is a flowchart illustrating a method for executing a request command according to an embodiment of the present invention.

FIG. 7 is a flowchart illustrating a method for executing a request command according to an embodiment of the present invention. The flowchart includes the following steps:

Step 700: Start.
Step 702: Receive a request command external to the server.
Step 704: Determine the contents of the request command to select a first CGI module or a second CGI module in order to execute the request command.

To summarize, in the server and associated execution method of the present invention, a single web page service module is utilized to receive a request command. The request command is executed by one of a plurality of different CGI modules based on the contents of the received request command, in which the different CGI modules correspond to different respective ports. The user therefore no longer needs to enter the port value when inputting the URL on the browser. Further, through utilizing the embodiments of the present invention, it is easier for users to set the domain name of the server, thus improving the entire user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A server, comprising:
   a processor; and
   a storage unit, operatively coupled to the processor;
   wherein the processor is configured to execute a program code stored in the storage unit to:
   receive a request command external to the server; and
   determine contents of the request command to select a first common gateway interface (CGI) module or a second CGI module in order to execute the request command, wherein the second CGI module and the first CGI module correspond to applications required to be executed by different respective authorities.

2. The server of claim 1, wherein the second CGI module and the first CGI module correspond to different respective ports.

3. The server of claim 2, wherein the first CGI module corresponds to a first port, the second CGI module corresponds to a second port, and when the request command does not specify any port, the processor executes the program code to select the first CGI module or the second CGI module to execute the request command through the first port.

4. The server of claim 3, wherein the first port is applicable to a HyperText Transport Protocol (HTTP).

5. The server of claim 3, wherein the second port is applicable to a system management interface or a file management system.

6. The server of claim 1, wherein the processor refers to an application corresponding to the request command to select the first CGI module or the second CGI module to execute the request command.

7. The server of claim 6, wherein when the request command corresponds to a web page access, the processor selects the first CGI module to execute the request command; and when the request command corresponds to a file management system, the processor selects the second CGI module to execute the request command.

8. The server of claim 1, wherein the first CGI module is a fast CGI module, and the second CGI module is a simple CGI module.

9. A method for executing a request command, comprising:
   receiving a request command external to a server; and
   determining contents of the request command to select a first common gateway interface (CGI) module or a second CGI module in order to execute the request command, wherein the second CGI module and the first CGI module correspond to applications required to executed by different respective authorities.

10. The method of claim 9, wherein the second CGI module and the first CGI module correspond to different respective ports.

11. The method of claim 10, wherein the first CGI module corresponds to a first port, the second CGI module corresponds to a second port, and the step of selecting the first CGI module or the second CGI module to execute the request command comprises:
   when the request command does not specify any port, using the first port to select the first CGI module or the second CGI module to execute the request command.

12. The method of claim 11, wherein the first port is applicable to a HyperText Transport Protocol (HTTP).

13. The method of claim 11, wherein the second port is applicable to a system management interface or a file management system.

14. The method of claim 9, wherein the step of determining contents of the request command to select the first CGI module or the second CGI module to execute the request command comprises:
    referring to an application corresponding to the request command, to select the first CGI module or the second CGI module to execute the request command.

15. The method of claim 14, wherein the step of determining contents of the request command to select the first CGI module or the second CGI module to execute the request command comprises:
    when the request command corresponds to a web page access, the web page service module selects the first CGI module to execute the request command; and
    when the request command corresponds to a file management system, the web page service module selects the second CGI module to execute the request command.

16. The method of claim 9, wherein the first CGI module is a fast CGI module, and the second CGI module is a simple CGI module.

* * * * *